Patented Sept. 30, 1941

2,257,297

UNITED STATES PATENT OFFICE 2,257,297

ABSORPTION OF OLEFINS IN ACID LIQUORS

Walter Henry Groombridge, Spondon, near Derby, England, assignor to Celanese Corporation of America, a corporation of Delaware No Drawing. Application February 20, 1934, Serial No. 712,171. In Great Britain March 1, 1933

17 Claims. (Cl. 260—460)

This invention relates to the manufacture of organic compounds from olefins, and especially to the treatment of mixtures comprising ethylene and propylene with sulphuric acid.

The reaction of olefins with sulphuric acid takes place with more or less readiness according to the olefin employed. Generally speaking, the lower the molecular weight of the olefin the less readily does this reaction occur. For example, butylene reacts with sulphuric acid more easily than does propylene, which in its turn reacts more easily than does ethylene. Thus, for a given acid concentration, propylene will react at a lower temperature than ethylene, while if, on the other hand, the same temperature and pressure be employed in each case, acid of higher concentration will be required to absorb ethylene than to absorb propylene. By making use of these differences in reactivity a separation may be effected between different olefins, which may at the same time be converted into the corresponding alcohols or ethers. Thus, by passing a mixture comprising propylene and ethylene through vessels containing sulphuric acid of successively higher concentration, a separation of the gases with the production of isopropyl and ethyl alcohols may be obtained.

It has now been found that, whereas the absorption of ethylene in a concentrated but not absolutely anhydrous sulphuric acid does not greatly affect the free acid concentration of the absorption liquor, the absorption of propylene causes a considerable rise in free acid concentration as the reaction proceeds; the free acid concentration being the ratio of free acid to free acid plus water in the absorption product. Thus, if a mixture comprising ethylene and propylene is first passed through one zone supplied with sulphuric acid of a concentration such that propylene is absorbed while ethylene is unaffected, and then through a second zone supplied with acid capable of absorbing ethylene, the concentration of free acid in the first zone rises steadily until it may even attain a value at which ethylene also begins to be absorbed.

According to the invention in such a selective absorption of propylene from admixture with ethylene water is added to the absorption liquor in the first zone in such amounts as to maintain the concentration of free acid therein at such a value, or within such a range, that under the other conditions employed, the liquor remains incapable of absorbing substantial quantities of ethylene. The water may be added in the liquid or vapour state, or even, especially if it is desired to cool the absorbing liquor, in the form of ice.

The critical concentration at which ethylene begins to be absorbed will, of course, vary with the temperature at which the absorption is carried out. When the propylene absorption is effected at a temperature of 15°–25° C. the free acid concentration should be maintained below 92 or 93% and most suitably can be maintained between about 70 and 90%.

The absorption of the olefins may be effected at any desired pressure but the use of super-atmospheric pressures increases the speed of absorption. Whilst quite high pressures may be used, moderately elevated pressures of 10 to 30 atmospheres give very satisfactory results.

In one method of applying the invention the olefin-containing gases are employed in admixture with an amount of water vapour sufficient to maintain the acid concentration within the desired limits; the quantity of water vapour present should, however, be carefully regulated so as to prevent the dilution of the acid to such a degree that it no longer absorbs the propylene efficiently. Such water vapour may be added to the olefin-containing mixture prior to the absorption, or it may be initially partly or wholly present in the mixture.

Alternatively, the water may be added to the acid in the liquid phase, either continuously or from time to time. For example, where the absorption is effected in towers or the like through which the acid is caused to circulate, water may be continuously admitted in the required amount, at any convenient point in the circuit. If, on the other hand, a non-circulatory system is employed, for instance as in a process where the gases to be absorbed are passed into a vessel containing the acid until absorption is complete, it may be more convenient to add the water from time to time, when the acid concentration approaches the maximum concentration desired.

The olefin-containing gases may with advantage be subjected to a pre-treatment whereby water vapour (except so much as it may be desired to retain for the purposes of the invention) and higher olefins and other compounds which react with sulphuric acid, and which might exert an unfavourable influence on the propylene absorption, are substantially eliminated before that absorption takes place. Thus, for example, the gases may be passed through sulphuric acid which should be used in such concentration, and under such conditions, that little or no propylene is absorbed. Conveniently the gases may be brought into contact at ordinary temperatures or lower with sulphuric acid of concentration of about 60 to 70%; for example they may be caused to pass through a tower or other vessel in countercurrent to such acid.

The absorption of the propylene and of the ethylene may be effected in any convenient way. As stated above, either a continuous or discontinuous type of process may be employed, and the acid may be brought into contact with the olefins in towers, closed vessels or any other type of apparatus, and under any suitable conditions of temperature and pressure. If desired, the acid may contain a catalyst for the absorption such as a silver salt or metallic silver.

The alkyl sulphates produced by the absorption may be treated in order to obtain the desired product. Conveniently the acid liquors may be diluted to a greater or less extent with water and heated to obtain alcohols or ethers. For example, the acid liquor may be circulated through a tower or other absorption vessel as described above, diluted with water, heated to remove the alcohol and/or ether and, if desired, some of the water; it may then be further reconcentrated, if necessary, and returned to the tower or other vessel.

The improvement in separation which can be effected by means of the invention is illustrated as follows:

When a gas mixture containing 13% of propylene and 21% of ethylene, e. g. a gas mixture obtained in oil cracking from which olefins higher than propylene have been removed, is passed under a pressure of 20 atmospheres through sulphuric acid originally of 87% concentration until 0.4 molecule of propylene per molecule of $H_2SO_4$ present have been absorbed, the isopropyl alcohol obtained on hydrolysis of the absorption product contains 2% ethyl alcohol. If passage of the same gas is continued until one molecule of propylene per molecule of $H_2SO_4$ has been absorbed, the isopropyl alcohol obtained on hydrolysis of the absorption product contains 6% of the ethyl alcohol. If, however, sufficient water is added at the intermediate stage to restore the free acid concentration to 87% and the propylene absorption then continued to the one molecule per molecule of $H_2SO_4$ stage, the ethyl alcohol content of the hydrolysis product is kept below 3%.

Although the invention has been described specifically with regard to the separation of ethylene and propylene by means of sulphuric acid and the manufacture of ethyl alcohol and isopropyl alcohol therefrom, it is not restricted to this process, but may be applied to any process in which olefins of differing reactivity towards an acid absorption agent are to be separated by means of such agent, and where the absorption causes a rise in the concentration of free acid in the absorbing liquor. For instance, the process of the invention may be applied to the above mentioned preliminary treatment of gas mixtures for the purpose of removing olefins higher than propylene, water being added to the absorbing liquor in this case so as to maintain the same incapable of absorbing substantial quantities of propylene or ethylene.

It should also be noted that the invention is not limited to the use of aqueous sulphuric acid as the absorbing liquor and that other acids which absorb olefins with the formation of alkyl esters, e. g. benzene sulphonic or other strong sulphonic acids or phosphoric acid, may be used.

What I claim and desire to secure by Letters Patent is:

1. In a process for the selective absorption of olefins from admixture with one another by means of acid liquors, of concentration and temperature such that they react with and absorb olefins to form and retain alkyl derivatives of the acid and to which the olefins show different degrees of reactivity, the steps of contacting a mixture comprising the olefins with such acid liquor and adding water to the acid liquor so as to maintain the free acid content thereof within such a range of concentrations, that, under the conditions obtaining in the absorption zone, the liquor absorbs at least one olefin while remaining incapable of absorbing substantial quantities of less reactive olefins.

2. In a process for the selective absorption of propylene from admixture with ethylene by means of an acid liquor, of a concentration and temperature such that it reacts with and absorbs propylene to form and retain an isopropyl derivative of the acid, the steps of contacting a gaseous mixture comprising the propylene and ethylene with such acid liquor and adding water to the acid liquor so as to maintain the free acid content thereof within such a range of concentrations, that, under the conditions obtaining in the absorption zone, the liquor absorbs propylene while remaining incapable of absorbing substantial quantities of ethylene.

3. In a process for the selective absorption of olefins from admixture with one another, the steps of contacting a mixture comprising the olefins with a sulphuric acid liquor of a concentration and temperature such that it reacts with and absorbs olefins to form and retain alkyl sulphuric acids and adding water to the liquor so as to maintain the free acid content thereof within such a range of concentrations, that, under the conditions obtaining in the absorption zone, the liquor absorbs at least one olefin while remaining incapable of absorbing substantial quantities of less reactive olefins.

4. In a process for the selective absorption of propylene from admixture with ethylene, the steps of contacting a gaseous mixture comprising the propylene and ethylene with a sulphuric acid liquor of a concentration of at least 70% and adding water to the acid liquor so as to maintain the free acid content thereof within such a range of concentrations, that, under the conditions obtaining in the absorption zone, the liquor absorbs propylene while remaining incapable of absorbing substantial quantities of ethylene.

5. In a process for the selective absorption of propylene from admixture with ethylene, the steps of contacting a gaseous mixture comprising the propylene and ethylene with aqueous sulphuric acid of 70–90% concentration at a temperature of the order of 15°–25° C. and adding water to the acid liquor so as to maintain the free acid content thereof at a concentration between 70 and 90%.

6. In a process for the selective absorption of propylene from admixture with ethylene, the steps of contacting a gaseous mixture comprising the propylene and ethylene with aqueous sulphuric acid of 70–90% concentration at a temperature of the order of 15°–25° C. and under a pressure higher than atmospheric and adding water to the acid liquor so as to maintain the free acid content thereof at a concentration between 70 and 90%.

7. In a process for the selective absorption of propylene from admixture with ethylene, the steps of contacting a gaseous mixture comprising the propylene and ethylene with aqueous sulphuric acid of 70-90% concentration at a temperature of the order of 15°-25° C. and under a pressure between 10 and 30 atmospheres and adding water to the acid liquor so as to maintain the free acid content thereof at a concentration between 70 and 90%.

8. Process for the manufacture of hydration products of olefins, which comprises contacting a gaseous mixture comprising olefins with an acid liquor, of a concentration and temperature such that it reacts with and absorbs olefins to form and retain alkyl derivatives of the acid, adding water to the acid liquor so as to maintain the free acid content thereof within such a range of concentrations, that, under the conditions obtaining in the absorption zone, the liquor absorbs at least one olefin while remaining incapable of absorbing substantial quantities of less reactive olefins and subjecting the absorption liquors so obtained to hydrolysis.

9. Process for the manufacture of hydration products of propylene from a gaseous mixture comprising propylene and ethylene, which comprises contacting the said gaseous mixture with aqueous sulphuric acid of 70-90% concentration at a temperature of the order of 15°-25° C., adding water to the acid liquor so as to maintain the free acid content thereof at a concentration between 70 and 90% and subjecting the absorption liquors so obtained to hydrolysis.

10. Process for the manufacture of hydration products of propylene from a gaseous mixture comprising propylene and ethylene, which comprises contacting the said gaseous mixture with aqueous sulphuric acid of 70-90% concentration at a temperature of the order of 15°-25° C. and under a pressure between 10 and 30 atmospheres, adding water to the acid liquor so as to maintain the free acid content thereof at a concentration between 70 and 90% and subjecting the absorption liquors so obtained to hydrolysis.

11. In a process for producing an olefin derivative, the steps of absorbing at least one olefin in a liquid mineral acid-acting medium at a temperature and pressure whereat the olefin absorption product is substantially in the liquid phase, and adding water to said medium so as to maintain therein during the absorption the ratio of free acid to free acid plus water within a predetermined range.

12. In a process for producing an olefin derivative, the steps of absorbing at least one olefin in a sulphuric acid medium at a temperature and pressure whereat the olefin absorption product is substantially in the liquid phase, and adding water to said medium so as to maintain therein during the absorption the ratio of free acid to free acid plus water within a predetermined range.

13. In a process for producing an olefin derivative, the steps of absorbing at least one olefin in a liquid mineral-acid acting medium at a temperature and pressure whereat the olefin absorption product is substantially in the liquid phase, and adding water to said medium so as to maintain therein during the absorption a ratio of free acid to free acid plus water above 0.6 and within a predetermined range.

14. In a process for producing an olefin derivative, the steps of absorbing at least one olefin in a sulphuric acid medium at a temperature and pressure whereat the olefin absorption product is substantially in the liquid phase, and adding water to said medium so as to maintain therein during the absorption a ratio of free acid to free acid plus water above 0.6 and within a predetermined range.

15. In a process for producing an olefin derivative from a mixture of olefins of different reactivities, the steps of absorbing from said mixture an olefin higher than propylene in a liquid mineral acid-acting medium at a temperature and pressure whereat the olefin absorption product is substantially in the liquid phase, and adding water to said medium so as to maintain therein during the absorption a ratio of free acid to free acid plus water within a range in which less reactive olefins in the mixture remain substantially unabsorbed.

16. In a process for producing an olefin derivative from a mixture of olefins of different reactivities, the steps of absorbing from said mixture an olefin higher than propylene in a sulphuric acid medium at a temperature and pressure whereat the olefin absorption product is substantially in the liquid phase, and adding water to said medium so as to maintain therein during the absorption a ratio of free acid to free acid plus water within a range in which less reactive olefins in the mixture remain substantially unabsorbed.

17. In a process for producing an olefin derivative from a mixture of olefins of different reactivities, the steps of absorbing from said mixture an olefin higher than propylene in a sulphuric acid medium at a temperature and pressure whereat the olefin absorption product is substantially in the liquid phase, and adding water to said medium so as to maintain therein during the absorption a ratio of free acid to free acid plus water above 0.6 and within a range in which less reactive olefins in the mixture remain substantially unabsorbed.

WALTER HENRY GROOMBRIDGE.